(12) United States Patent
Rzadca et al.

(10) Patent No.: US 8,733,883 B2
(45) Date of Patent: *May 27, 2014

(54) DETECTING STRETCH OR SHRINK IN PRINT MEDIA

(75) Inventors: Mark C. Rzadca, Fairport, NY (US); Samuel Chen, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 62 days.

This patent is subject to a terminal disclaimer.

(21) Appl. No.: 13/484,369

(22) Filed: May 31, 2012

(65) Prior Publication Data

US 2013/0321515 A1 Dec. 5, 2013

(51) Int. Cl.
*B41J 29/393* (2006.01)
*B41J 29/38* (2006.01)
*B41J 2/21* (2006.01)

(52) U.S. Cl.
CPC .............. *B41J 29/393* (2013.01); *B41J 2/2135* (2013.01)
USPC ............................................... 347/19; 347/16

(58) Field of Classification Search
CPC ................................ B41J 29/38; B41J 29/393
USPC .................................. 347/14–16, 19, 101, 104
See application file for complete search history.

(56) References Cited

U.S. PATENT DOCUMENTS 6,118,132 A * 9/2000 Tullis ........................ 250/559.39
7,032,518 B2 * 4/2006 Scheffer et al. ................ 101/485

\* cited by examiner

*Primary Examiner* — An Do
(74) *Attorney, Agent, or Firm* — Nancy R. Simon; Amit Singhal

(57) ABSTRACT

A printing system includes a print media having two sets of test patterns formed or printed in at least two margins adjacent a content area on the print media. The two sets of test patterns are separated by a pattern distance and at least two test patterns in each set of test patterns have a different number of marks. Two integrated imaging systems are disposed opposite the print media and are mechanically tied together and separated by a fixed distance. The integrated imaging systems substantially simultaneously capture images of the two sets of test patterns. An image processing device can process the images to determine if one or more size variations have occurred in the print media in the in-track direction.

11 Claims, 10 Drawing Sheets

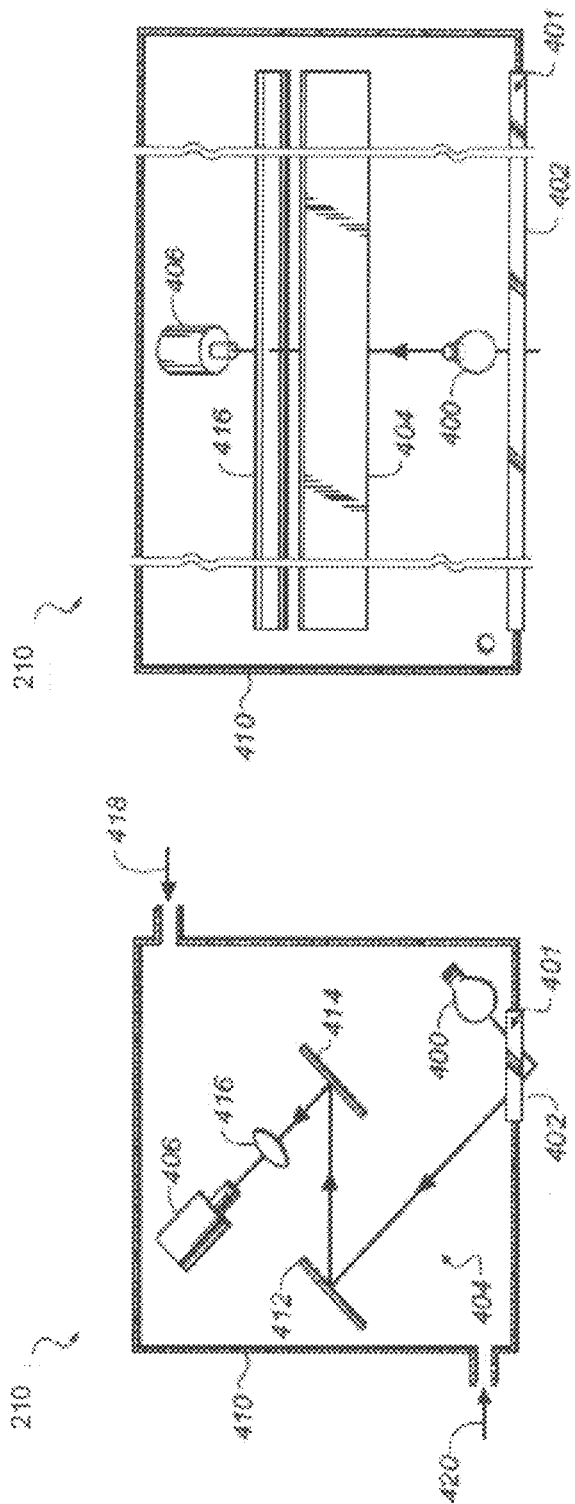

DETECTING STRETCH OR SHRINK IN PRINT MEDIA

CROSS REFERENCE TO RELATED APPLICATIONS

Reference is made to commonly-assigned, U.S. patent application Ser. No. 13/484,378, entitled "DETECTING STRETCH OR SHRINK IN PRINT MEDIA", filed concurrently herewith.

TECHNICAL FIELD

The present invention relates generally to printing systems and more particularly to the detection of stretch or shrink in a print media moving through a printing system.

BACKGROUND

In commercial inkjet printing systems, a print media is physically transported through the printing system at a high rate of speed. For example, the print media can travel 650-1000 feet per minute. A commercial inkjet printing system can include multiple lineheads, with each linehead having one or more printheads. The printheads typically include multiple nozzle plates, with each nozzle plate having precisely spaced and sized nozzles. The cross-track pitch, measured as drops per inch or dpi, is determined by the nozzle spacing. The dpi can be as high as 600, 900, or 1200 dpi.

The print media can receive a large amount of ink during printing, especially with water-based ink or in high ink laydown regions of the printed content (e.g. a picture with a lot of dense black background). In turn, the aqueous component of the ink is absorbed into the print media and can cause the print media to swell and stretch, especially if the print media is under tension. Stretch is usually significantly higher in the direction of movement (i.e., the in-track direction) than in the cross-track direction.

Additionally, heat is typically applied at one or more locations in a printing system to dry the ink that has been applied to the print media. Drying of the print media can cause the print media to shrink. When the print media is heated in between lineheads, regions of the print media can be stretched and shrunk one or more times as the print media moves through a printing system.

Printing with several color planes in which each color record is printed sequentially requires color laydown correlation. Unanticipated or unaccounted for stretch or shrink in the print media can cause a loss of color correlation and can lead to blurry content or hue degradation. Additionally, printing on both sides of the print media usually requires front-to-back registration, and the second side of the print media is usually printed significantly later than the first side.

Visible patterns such as dots, lines and polygons are typically printed on the print media so that a high speed and high magnification camera can record the pattern to determine if there are deviations from a reference value. If there are deviations, in-track and cross-track compensation values can be calculated and used to adjust the position or speed of the print media or of the drops of ink. Such cameras are often costly and dedicated for imaging the visible patterns. The cameras are usually kept stationary to monitor for the dots, lines and polygon patterns, and can monitor only a limited portion of the print media. If more visible patterns are printed than there are cameras, the extra patterns are either ignored or the cameras are moved to different positions to analyze all of the patterns in a sequential manner. Moreover, the visible patterns of dots, lines or polygons are usually large (millimeter to centimeter in size) and printed on the edges of the print media or the edges of the printed content. The printed visible patterns must be trimmed away before the printed content is assembled into a final product, such as a magazine or book. Due to cost considerations, the number of digital cameras mounted in a printing system is usually kept to a minimum to control the overall cost of the printing system.

SUMMARY

In one aspect, a printing system includes a print media having two sets of test patterns formed or printed in margins adjacent a content area on the print media and separated by a pattern distance $D_P$. The distance $D_P$ can vary when the print media experiences size variations during the printing process. At least two test patterns in each set of test patterns have a different number of marks. A pair of integrated imaging systems is disposed opposite the print media and are mechanically connected to one another and separated by a fixed distance $D_K$. Each integrated imaging system in the pair of integrated imaging systems includes a housing; an opening in the housing for receiving light reflected from the print media; a folded optical assembly in the housing that receives the reflected light and transmits the light a predetermined distance; and an image sensor within the housing that receives the light and captures one or more images of a respective set of test patterns.

In another aspect, the printing system can include an image processing device that is connected to the pair of integrated imaging systems for analyzing the test pattern signals to detect size variations in the print media in the in-track direction.

In another aspect, a storage device can be connected to the image processing device for storing reference test pattern signals. The reference test pattern signals can be compared with the measured test pattern signals to determine whether a size variation has occurred in the print media in the in-track direction.

In another aspect, a storage device can be connected to the image processing device for storing test pattern signals.

In another aspect, a printing system can include one or more lineheads that jet ink or liquid onto a print media and at least one pair of integrated imaging systems are disposed opposite the print media and mechanically tied together and separated by a fixed distance $D_K$. A method for detecting size variations in the print media as the print media is transported through the printing system can include (a) substantially simultaneously capturing images of two sets of test patterns printed or formed in margins adjacent a content area on the moving print media, where the two sets of test patterns are separated by a pattern distance $D_P$ and at least two test patterns in each set of test patterns have a different number of marks; (b) producing test pattern signals each representing a respective set of test patterns in the captured images; and (c) analyzing the test pattern signals to determine whether a size variation has occurred in the print media in the in-track direction.

In another aspect, the method can include (d) determining one or more compensation values based on the size variation; and (e) adjusting one or more operations or settings of the printing system based on the one or more compensation values.

In another aspect, the method can include prior to performing (d), determining whether the size variation equals or exceeds a threshold value, and if the size variation equals or exceeds the threshold value, performing (d).

In another aspect, the two sets of test patterns can be two sets of visible test patterns, two sets of non-objectionable test patterns, or two sets of a combination of visible and non-objectionable test patterns.

BRIEF DESCRIPTION OF THE DRAWINGS

Embodiments of the invention are better understood with reference to the following drawings. The elements of the drawings are not necessarily to scale relative to each other.

FIG. 4 is a cross-sectional view along line 4-4 in FIG. 3 in an embodiment in accordance with the invention;

FIG. 5 is a cross-sectional view along line 5-5 in FIG. 3 in an embodiment in accordance with the invention;

DETAILED DESCRIPTION

Figure 1:
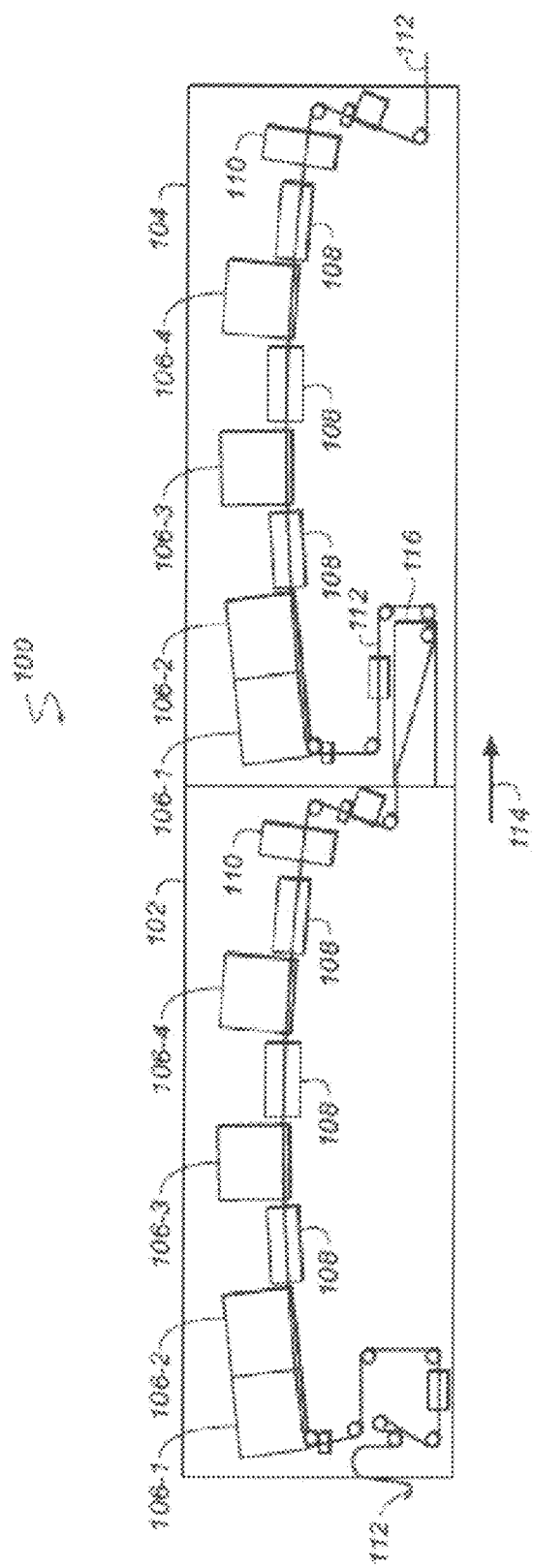
FIG. 1 illustrates one example of an inkjet printing system for continuous web printing on a print media.

Throughout the specification and claims, the following terms take the meanings explicitly associated herein, unless the context clearly dictates otherwise. The meaning of "a," "an," and "the" includes plural reference, the meaning of "in" includes "in" and "on." Additionally, directional terms such as "on", "over", "top", "bottom", "left", "right" are used with reference to the orientation of the Figure(s) being described. Because components of embodiments of the present invention can be positioned in a number of different orientations, the directional terminology is used for purposes of illustration only and is in no way limiting.

The present description will be directed in particular to elements forming part of, or cooperating more directly with, an apparatus in accordance with the present invention. It is to be understood that elements not specifically shown, labeled, or described can take various forms well known to those skilled in the art. In the following description and drawings, identical reference numerals have been used, where possible, to designate identical elements. It is to be understood that elements and components can be referred to in singular or plural form, as appropriate, without limiting the scope of the invention.

The example embodiments of the present invention are illustrated schematically and not to scale for the sake of clarity. One of ordinary skill in the art will be able to readily determine the specific size and interconnections of the elements of the example embodiments of the present invention.

As described herein, the example embodiments of the present invention provide a printhead or printhead components typically used in inkjet printing systems. However, many other applications are emerging which use inkjet printheads to emit liquids (other than inks) that need to be finely metered and deposited with high spatial precision. Such liquids include inks, both water based and solvent based, that include one or more dyes or pigments. These liquids also include various substrate coatings and treatments, various medicinal materials, and functional materials useful for forming, for example, various circuitry components or structural components. As such, as described herein, the terms "liquid" and "ink" refer to any material that is ejected by the printhead or printhead components described below.

Inkjet printing is commonly used for printing on paper. However, there are numerous other materials in which inkjet is appropriate. For example, vinyl sheets, plastic sheets, textiles, paperboard, and corrugated cardboard can comprise the print media. Additionally, although the term inkjet is often used to describe the printing process, the term jetting is also appropriate wherever ink or other liquids is applied in a consistent, metered fashion, particularly if the desired result is a thin layer or coating.

Inkjet printing is a non-contact application of an ink to a print media. Typically, one of two types of ink jetting mechanisms are used and are categorized by technology as either drop on demand ink jet (DOD) or continuous ink jet (CIJ). The first technology, "drop-on-demand" (DOD) ink jet printing, provides ink drops that impact upon a recording surface using a pressurization actuator, for example, a thermal, piezoelectric, or electrostatic actuator. One commonly practiced drop-on-demand technology uses thermal actuation to eject ink drops from a nozzle. A heater, located at or near the nozzle, heats the ink sufficiently to boil, forming a vapor bubble that creates enough internal pressure to eject an ink drop. This form of inkjet is commonly termed "thermal ink jet (TIJ)."

The second technology commonly referred to as "continuous" ink jet (CIJ) printing, uses a pressurized ink source to produce a continuous liquid jet stream of ink by forcing ink, under pressure, through a nozzle. The stream of ink is perturbed using a drop forming mechanism such that the liquid jet breaks up into drops of ink in a predictable manner. One continuous printing technology uses thermal stimulation of the liquid jet with a heater to form drops that eventually become print drops and non-print drops. Printing occurs by selectively deflecting one of the print drops and the non-print drops and catching the non-print drops. Various approaches for selectively deflecting drops have been developed including electrostatic deflection, air deflection, and thermal deflection.

Additionally, there are typically two types of print media used with inkjet printing systems. The first type is commonly referred to as a continuous web while the second type is commonly referred to as a cut sheet(s). The continuous web of print media refers to a continuous strip of media, generally originating from a source roll. The continuous web of print media is moved relative to the inkjet printing system components via a web transport system, which typically include drive rollers, web guide rollers, and web tension sensors. Cut sheets refer to individual sheets of print media that are moved relative to the inkjet printing system components via rollers and drive wheels or via a conveyor belt system that is routed through the inkjet printing system.

The invention described herein is applicable to both types of printing technologies. As such, the term printhead, as used herein, is intended to be generic and not specific to either technology. Additionally, the invention described herein is applicable to both types of print media. As such, the term print media, as used herein, is intended to be generic and not as specific to either type of print media or the way in which the print media is moved through the printing system.

The terms "upstream" and "downstream" are terms of art referring to relative positions along the transport path of the print media; points on the transport path move from upstream to downstream. In FIGS. 1, 2, 6, 8, 10, and 11 the print media moves in the direction as indicated by transport direction arrow 114. Where they are used, terms such as "first", "second", and so on, do not necessarily denote any ordinal or priority relation, but are simply used to more clearly distinguish one element from another.

Referring now to the schematic side view of FIG. 1, there is shown one example of an inkjet printing system for continuous web printing on a print media. Printing system 100 includes a first printing module 102 and a second printing module 104, each of which includes lineheads 106, dryers 108, and a quality control sensor 110. Each linehead 106 typically includes multiple printheads (not shown) that apply ink or another liquid to the surface of the print media 112 that is adjacent to the printheads. For descriptive purposes only, the lineheads 106 are labeled a first linehead 106-1, a second linehead 106-2, a third linehead 106-3, and a fourth linehead 106-4. In the illustrated embodiment, each linehead 106-1, 106-2, 106-3, 106-4 applies a different colored ink to the surface of the print media 112 that is adjacent to the lineheads. By way of example only, linehead 106-1 can apply cyan colored ink, linehead 106-2 magenta colored ink, linehead 106-3 yellow colored ink, and linehead 106-4 black colored ink.

The first printing module 102 and the second printing module 104 also include a web tension system that serves to physically move the print media 112 through the printing system 100 in the transport direction 114 (left to right as shown in the figure). The print media 112 enters the first printing module 102 from a source roll (not shown) and the linehead(s) 106 of the first module applies ink to one side of the print media 112. As the print media 112 feeds into the second printing module 104, a turnover module 116 is adapted to invert or turn over the print media 112 so that the linehead(s) 106 of the second printing module 104 can apply ink to the other side of the print media 112. The print media 112 then exits the second printing module 104 and is collected by a print media receiving unit (not shown).

Figure 2:
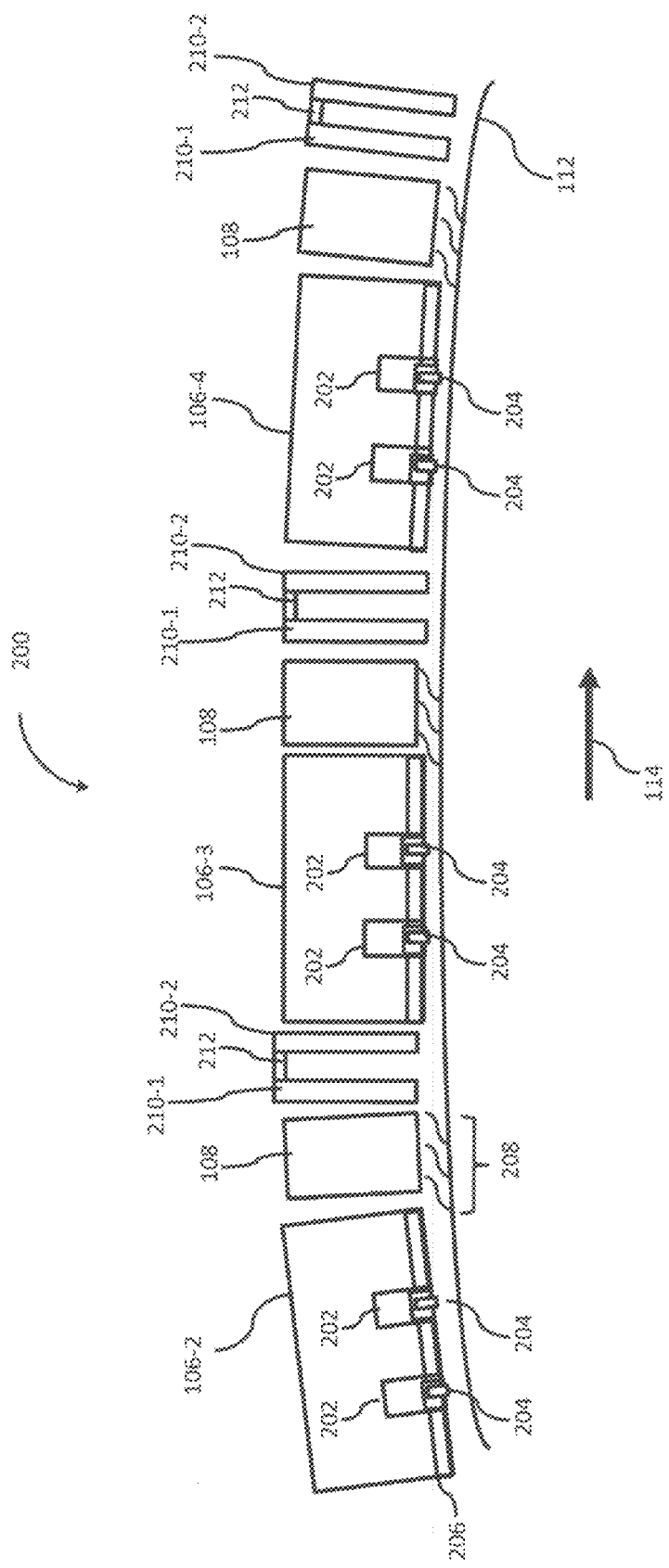
FIG. 2 depicts an example of a portion of a printing system in an embodiment in accordance with the invention.

FIG. 2 depicts an example of a portion of a printing system in an embodiment in accordance with the invention. As the print media 112 is directed through printing system 200, the lineheads 106, which typically include one or more printheads 202, apply ink or another liquid onto the print media 112 via the nozzle arrays 204 of the printheads 202. The printheads 202 within each linehead 106 are located and aligned by a support structure 206 in the illustrated embodiment. After the ink is jetted onto the print media 112, the print media 112 passes beneath dryers 108 which apply heat 208 to the ink on the print media.

A pair of integrated imaging systems 210-1, 210-2 is positioned after each dryer 108 in the illustrated embodiment. The integrated imaging systems 210-1, 210-2 in a pair are mechanically tied to one another such that the integrated imaging systems are separated by a fixed distance ($D_K$). By way of example only, the integrated imaging systems 210-1, 210-2 can be mechanically connected by a metal connecting piece 212.

The pairs of integrated imaging systems 210-1, 210-2 are used to detect size variations in the print media in the in-track direction (i.e., the transport direction 114). The size variations can occur locally in the print media in embodiments in accordance with the invention. For example, one area of the print media can stretch while an adjacent or nearby area can shrink. Alternatively, in some embodiments, the size variation can occur over a larger area of the print media. And finally, the size variations can occur both locally and over larger areas of the print media in some embodiments in accordance with the invention.

A printing system can include any number of pairs of integrated imaging systems. Moreover, the pairs of integrated imaging systems 210-1, 210-2 can be positioned differently in other embodiments in accordance with the invention. For example, a printing system can include a pair of integrated imaging systems after each linehead 106. The sets of test patterns can be pre-printed or formed on the print media, and a calibration method can be performed to determine the times the pair of integrated imaging systems is turned on to scan the print media and turned off.

Alternatively, a printing system can include a pair of integrated imaging systems before linehead 106-1 and a pair of integrated imaging systems after each dryer 108. And in another embodiment, a printing system can include a pair of integrated imaging systems after each linehead 106 and a pair of integrated imaging systems after each dryer 108.

Figure 3:
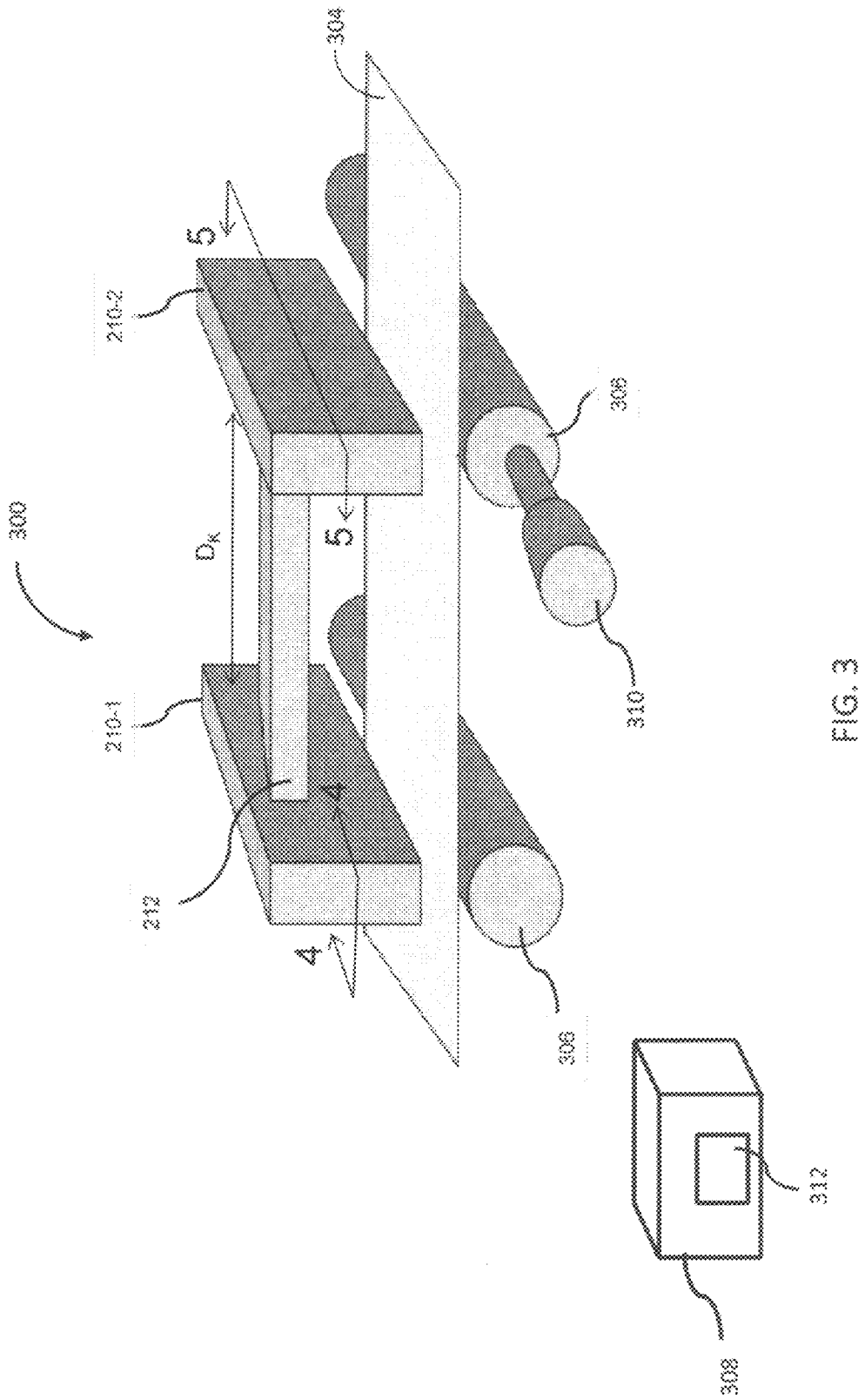
FIG. 3 illustrates one example of locations for a pair of integrated imaging systems 210-1, 210-2 shown in FIG. 2.

Referring now to FIG. 3, there is shown one example of locations for a pair of integrated imaging systems 210-1, 210-2 shown in FIG. 2. Printing system 300 includes a pair of integrated imaging systems 210-1, 210-2 disposed over the print media 304 at locations in the printing system 300 where the print media 304 is transported over rollers 306 in an embodiment in accordance with the invention. The print media 304 can be more stable, both in the cross-track and in-track directions when moving over the rollers 306. In other embodiments in accordance with the invention, one or more pairs of integrated imaging systems can be positioned at any location in a printing system.

The pair of integrated imaging systems 210-1, 210-2 is positioned so that the upstream integrated imaging system (i.e., imaging system 210-1) images one or more sets of test patterns arranged in a row in the cross-track direction (across the width of the print media) and the downstream integrated imaging system (i.e., integrated imaging system 210-2) substantially simultaneously images similarly positioned test patterns separated from the first row of test patterns by a distance ($D_P$). The distance ($D_P$) is substantially the same distance as ($D_K$) when the print media 304 has not experienced any size variations. The distance ($D_P$) can vary during the printing process if the print media experiences size variations during the printing process.

Motion encoder 310 can be used to produce an electronic pulse or signal proportional to a fixed amount of incremental motion of the print media in the in-track direction. The signal from motion encoder 310 can be used to trigger an image sensor (see 406 in FIG. 4) to begin scanning the moving print media 304. The image or pixel data can then be used to detect any size variations in the print media.

The pair of integrated imaging systems 210-1, 210-2 are connected to an image processing device 308 that is used to process the captured images, detect size variations in the in-track direction of the print media, and determine one or more compensation values based on the detected size variations in an embodiment in accordance with the invention. The pair of integrated imaging systems 210-1, 210-2 can be connected to and transmit data to the image processing device 308 through a wired or wireless connection. The image processing device 308 can be one or more processing devices, such as a computer or a programmable logic circuit.

Connected to the image processing device 308 is a storage device 312. The storage device 312 can be used to store reference test pattern signals or measured test pattern signals. The test pattern signals are described in more detail with respect to FIGS. 9-11. The storage device 312 can be implemented as one or more external storage devices, as one or more storage devices included within image processing device 308, or some combination thereof.

FIG. 4 is a cross-sectional view along line 4-4 in FIG. 3 in an embodiment in accordance with the invention. Each integrated imaging system 210 includes light source 400, transparent cover 402, folded optical assembly 404, and image sensor 406 all enclosed within housing 410. In the illustrated embodiment, folded optical assembly 404 includes mirrors 412, 414 and lens 416. Mirrors 412, 414 can be implemented with any type of optical elements that reflects light in embodiments in accordance with the invention.

Light source 400 transmits light through transparent cover 402 and towards the surface of the print media (not shown). The light reflects off the surface of the print media and propagates through the transparent cover 402 and along the folded optical assembly 404, where mirror 412 directs the light towards mirror 414, and mirror 414 directs the light toward lens 416. The light is focused by lens 416 to form an image on image sensor 406. Image sensor 406 captures one or more images of the print media as the print media moves through the imaging system by converting the reflected light into electrical signals.

Folded optical assembly 404 bends or directs the light as it is transmitted to image sensor 406 such that the optical path traveled by the light is longer than the size of integrated imaging system 210. Folded optical assembly 404 allows the integrated imaging system 216 to be constructed more compactly, reducing the weight, dimensions, and cost of the integrated imaging system. Folded optical assembly 404 can be constructed differently in other embodiments in accordance with the invention. Additional or different optical elements can be included in folded optical assembly 404.

The transparent cover 402 is disposed over an opening 401 in the housing 410. Transparent cover 402 is optional and can be omitted in other embodiments in accordance with the invention.

Integrated imaging system 210 can also include vent openings 418, 420. Vent opening 418 can be used to input air or gas while vent opening 420 can be used to output exhaust. The input air or gas can be used to maintain a clean environment and control the temperature within integrated imaging system 210. In another embodiment in accordance with the invention, integrated imaging system 210 can include one or more vent openings (e.g., vent opening 418) that input air or gas and the opening 401 in the housing 410 can be used to output exhaust.

FIG. 5 is a cross-sectional view along line 5-5 in FIG. 3 in an embodiment in accordance with the invention. As described, light source 400 transmits light through transparent cover 402 and towards the surface of the print media (not shown). The light reflects off the surface of the print media, propagates along folded optical assembly, and is directed toward lens 416. Lens 416 focuses the light to form an image on image sensor 406. Image sensor 406 can be implemented with any type of image sensor, including, but not limited to, one or more linear image sensors constructed as a charge-coupled device (CCD) image sensor or a complementary metal oxide semiconductor (CMOS) image sensor.

Combining all the optics components into a discrete integrated imaging system produces a self-contained imaging system that can be relatively low in cost to manufacture. It is feasible to mount several integrated imaging systems in a commercial printing system for image quality monitoring and feedback control because each integrated imaging system is compact in size. Similarly, the use of multiple integrated imaging systems in a printing system is possible due to the relatively lower cost of each integrated imaging system.

As discussed earlier, image sensor 406 can receive a signal from a motion encoder (e.g., 310 in FIG. 3) each time an incremental motion of the print media occurs in the feed direction. The signal from the motion encoder is used to trigger image sensor 406 to begin integrating the light reflected from the print media. In the case of a linear image sensor, the unit of incremental motion is typically configured such that an integration period begins with sufficient frequency to sample or image the print media in the feed direction with the same resolution as is produced in the cross-track direction. If the trigger occurs at a rate which produces a rate that results in sampling in the in-track (feed) direction at a higher rate, an image that is over sampled in that direction is produced and the imaged content appears elongated or stretched in the in-track direction. Conversely, a rate that is lower for the in-track direction produces imaged content that is compressed in the in-track direction.

The time period over which the integration occurs determines how much print media moves through the field of view of the imaging system. With shorter integration periods such as a millisecond or less, the motion of the print media can be minimized so that fine details in the in-track direction can be imaged. When longer integration periods are used, the light reflected off the print media is collected while the print media is moving and the motion of the print media means the printed content is blurred in the direction of motion. The blurring in the direction of motion has the effect of averaging the pixel data in one direction, the in-track (feed) direction. Averaging the pixel data through blurring is also known as optical averaging. By performing the averaging optically with longer integration periods, the amount of data that is transferred to and processed by an image processing device (e.g., 308 in FIG. 3) is reduced.

In one embodiment in accordance with the invention, the integration time period is based on the length of the test pattern that has the highest number of marks. The image sensors in a pair of integrated imaging systems substantially simultaneously scan different sets of test patterns formed or printed on the print media. The image sensor in each integrated imaging system is repeatedly turned on for a known time period and then turned off in an embodiment in accordance with the invention. A test pattern signal is produced for each test pattern where the amplitude of each test pattern signal represents the number of marks scanned by the image sensors. By way of example only, the amplitudes of the test pattern signals can be used to determine whether the print media has stretched or shrunk in the in-track direction.

Each time the print media passes by the imaging station, two images are captured, one from the upstream integrated imaging system and one from the downstream integrated imaging system. The captured images can be scans of the margin above and below the printed content region in an embodiment in accordance with the invention. The locations of the margins on the print media are determined using techniques that are known in the art. When the print media is cut sheet, it is known to use a lead edge sensor to detect the lead edge of the cut sheet print media as the print media is transported through the printing system. For example, a Keyence sensor can be used as a lead edge sensor. Once the location of the lead edge of the print media is known, along with the media linear dimension, the pair of integrated imaging systems is triggered to begin scanning in the leading (i.e., downstream) and trailing (i.e., upstream) margin regions.

For continuous web printing systems, a different mechanism can be used since the print media is continuous with no distinct breaks. One known technique uses the known location of the content to be printed to determine the locations of the upstream and downstream margin regions.

Figure 6:
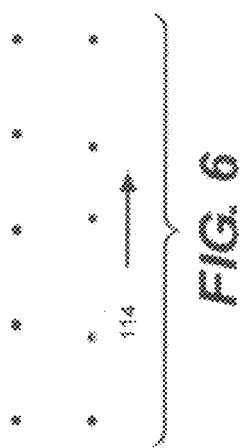
FIG. 6 depicts an example of a test pattern in an embodiment in accordance with the invention.

Referring now to FIG. 6, there is shown one example of a set of test patterns on a print media in an embodiment in accordance with the invention. Each test pattern includes one or more marks. The marks can be printed such as dots, polygons, or lines. Alternatively, the marks can be formed in or on the print media, such as dimples or raised lines. The set of test pattern repeats over a portion of the print media in an embodiment in accordance with the invention.

In the illustrated embodiment, each test pattern in the set of test patterns has a unique number of marks, in that a number of marks in one test pattern differ from the number of marks in the other test patterns in the set. Other embodiments in accordance with the invention can configure the test patterns differently. By way of example only, a set of test patterns can include multiple test patterns with every two adjacent test patterns having a different number of marks.

In one embodiment in accordance with the invention, the test patterns are implemented as non-objectionable test patterns. A non-objectionable test pattern forms a pattern, shape, or design that is not significantly discernable by the human vision system or intelligence but can be detected by an imaging system (e.g., imaging system 210 in FIGS. 3-5). The marks included in each test pattern can be regularly or irregularly spaced so long as they appear non-objectionable. In the illustrated embodiment the marks are implemented as dots. The dots can also be of various diameters, so as to be small enough to be non-objectionable, but large enough to be detectable by the imaging system.

Figure 7:
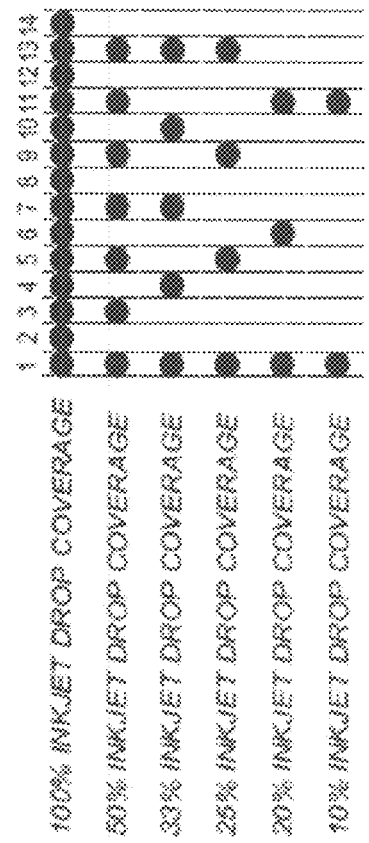
FIG. 7 illustrates examples of different ink drop coverage in an embodiment in accordance with the invention.

Referring now to FIG. 7, there is shown examples of different ink drop coverage in an embodiment in accordance with the invention. The marks in the test patterns can be spaced relatively close or far from each other. When the marks are spaced farther apart, such as with the 20% or 10% inkjet drop coverage, the drop coverage is low. In general, test marks produced at the lower inkjet drop coverage are less objectionable but can be more difficult to detect by the imaging system.

Figure 8:
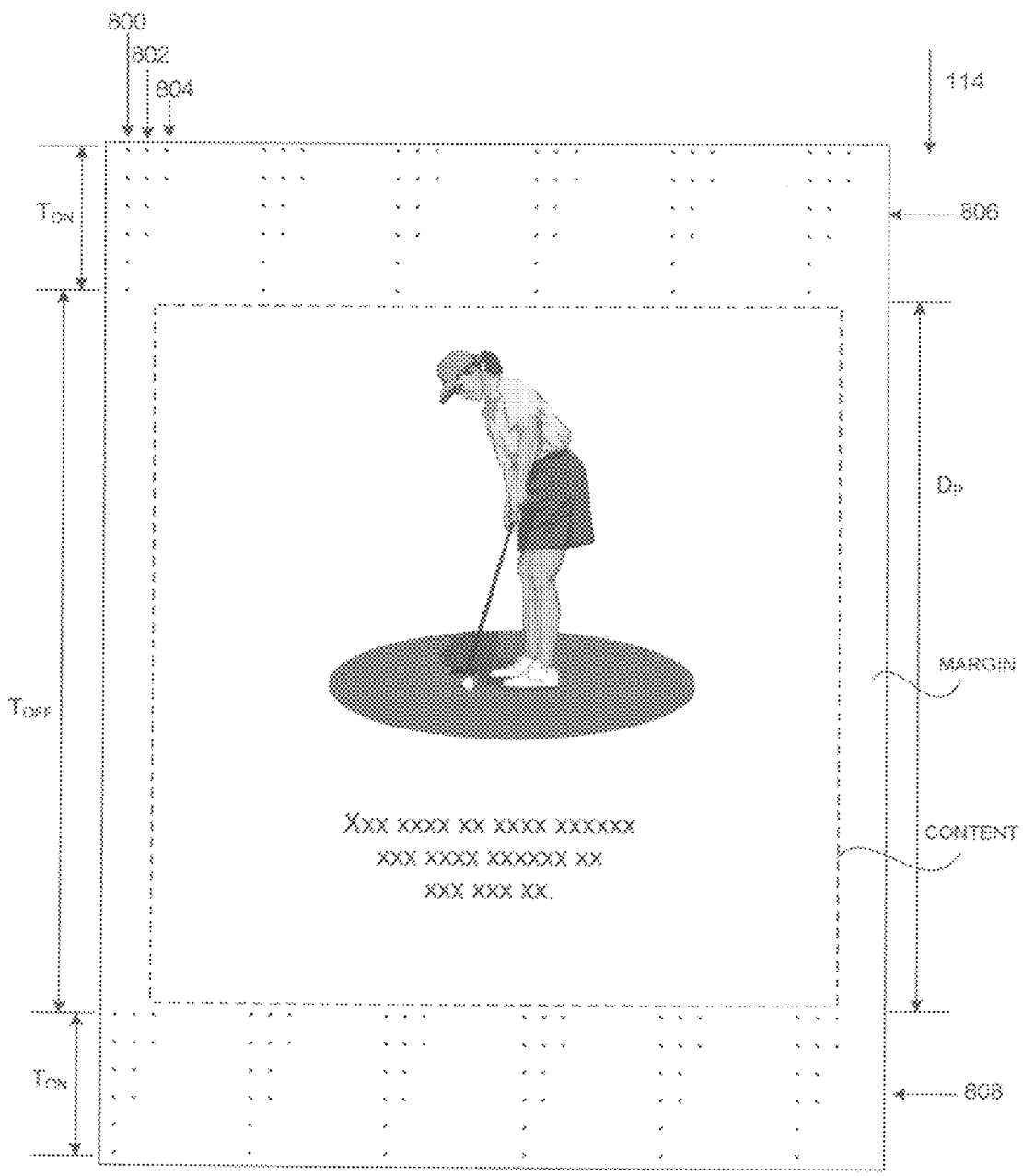
FIG. 8 depicts examples of content and test patterns on a print media in an embodiment in accordance with the invention.

FIG. 8 depicts an example of content and test patterns on a print media in an embodiment in accordance with the invention. A content area is an area on the print media where published information such as text, images, animation, and graphics will be printed on the print media. In FIG. 8, the content in the content area includes both text (indicated by the xx's) and graphics.

The content area is surrounded by margins of print media where published information is not printed. Included in at least two of the margins is one or more sets of test patterns that will be printed, are pre-printed, or are formed on the print media. The at least two margins can either be trimmed away at a later time or remain on the print media.

Each test pattern has a known number of marks. One set of test patterns includes test patterns 800, 802, 804. Test pattern 800 includes six dots, test pattern 802 four dots, and test pattern 804 two dots. Other embodiments can include a different number or arrangement of test patterns. The test patterns 800, 802, 804 can be implemented as non-objectionable test patterns, as visible test patterns, or as a combination of visible and non-objectionable test patterns.

Multiple sets of test patterns are printed or formed in a row along the upstream margin 806 and the downstream margin 808 (relative to the content area and the transport direction 114) in the illustrated embodiment. The distance between the upstream and downstream rows of test patterns is the distance between patterns $D_P$. As indicated in FIG. 8, one technique for analyzing the test patterns to determine if the print media has stretched or shrunk is to turn on the image sensors in a pair of integrated imaging systems for a known period of time $T_{ON}$ so that the image sensors can scan the test patterns 800, 802, 804 as the print media passes the imaging systems. In the illustrated embodiment, the known time period is associated with test pattern 800, the test pattern with the highest number of dots.

Figure 10A:
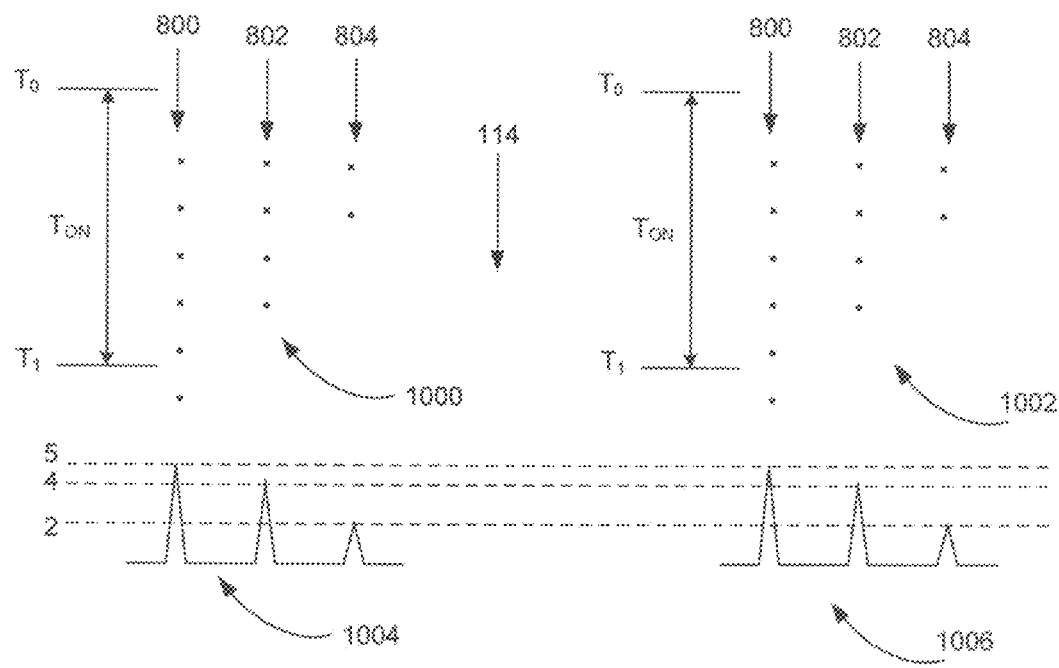
FIGS. 10A-10C illustrate a first set of examples of scanned test patterns and resulting test pattern signals in an embodiment in accordance with the invention.
Figure 10B:
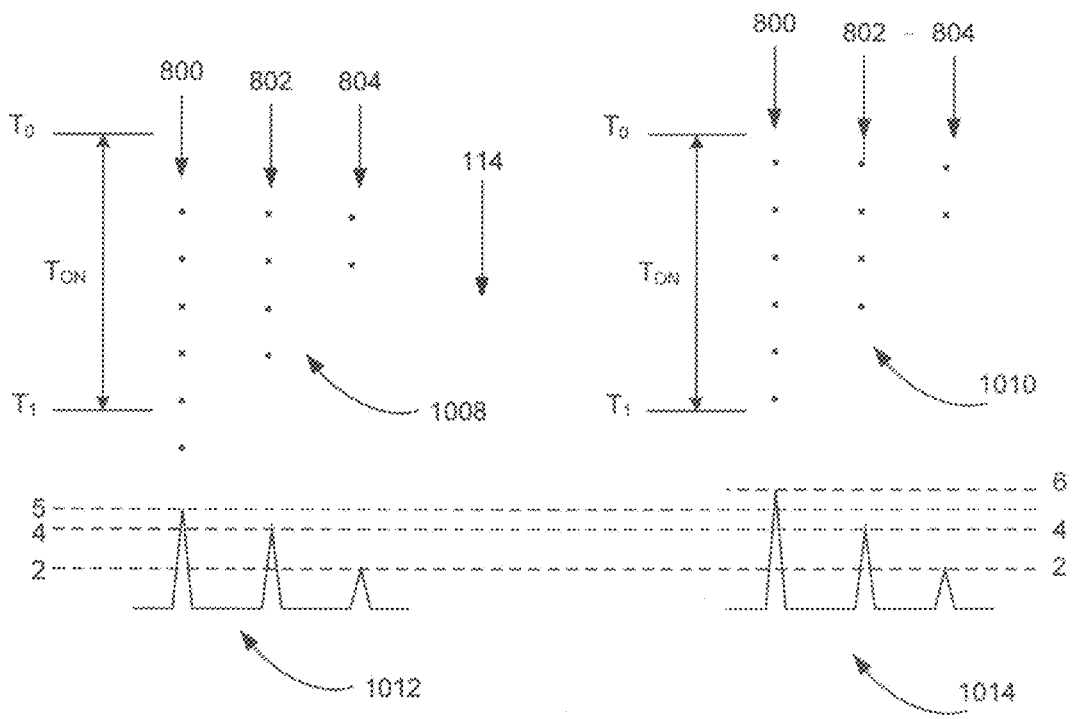
Figure 10C:
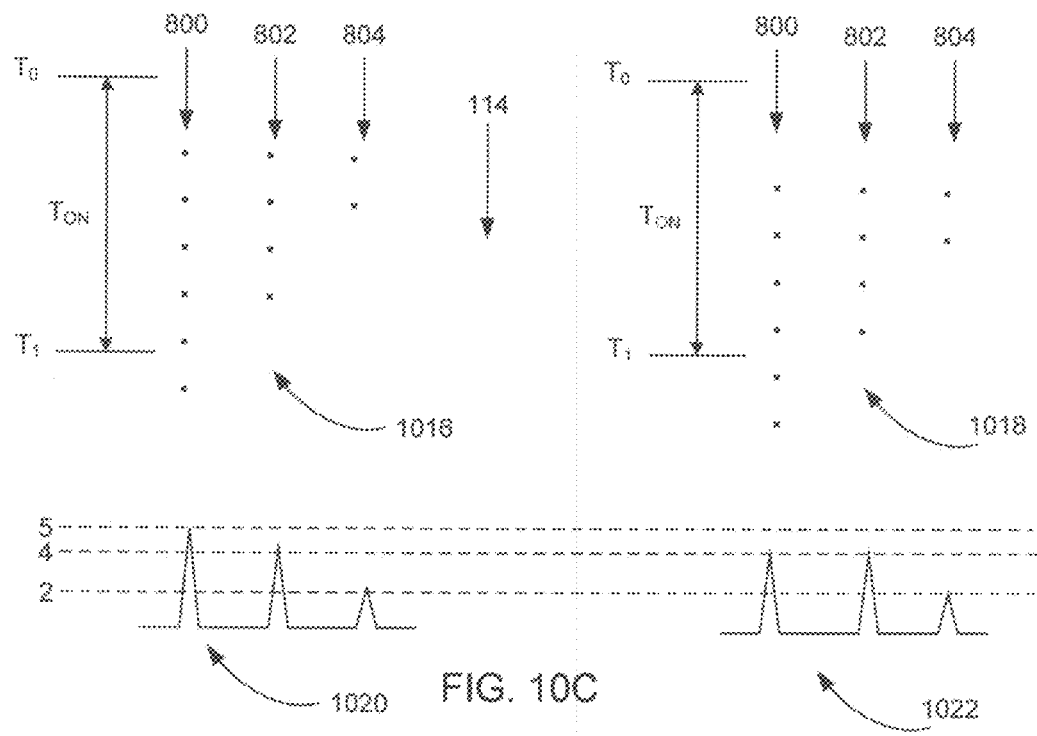

The image sensors are then turned off for a time period $T_{OFF}$. $T_{OFF}$ can be greater than $D_P$ in embodiments where $T_{ON}$ is less than the number of marks in test pattern 800. FIGS. 10A-10C illustrate one such embodiment.

The image sensors in one or more pairs of integrated imaging systems are repeatedly turned on and off while the margins are imaged from the print media. The image sensors can be turned on and off for every row of test patterns, at regular time intervals, or at selected times. The captured images of the test patterns are processed to determine whether any portion(s) of the print media has experienced size variations.

Figure 9:
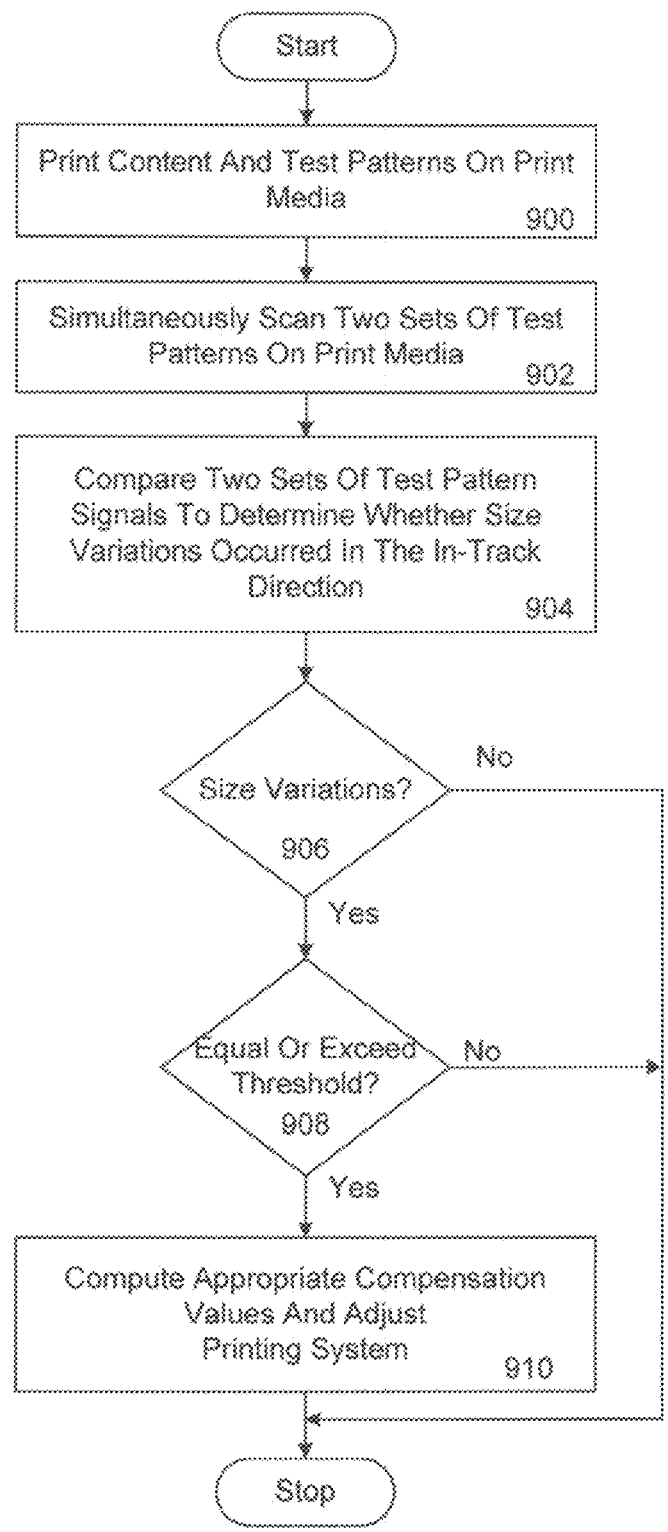
FIG. 9 is a flowchart of a method for detecting size variations in a moving print media in an embodiment in accordance with the invention.

The images of the test patterns are converted to digital representations of the print media suitable for analysis in an image processing device, such as, for example, processing device 308 (see FIG. 3). Referring now to FIG. 9, there is shown a method for detecting size variations in a moving print media in an embodiment in accordance with the invention. Initially, both the content and the test patterns are printed on a print media (block 900). In another embodiment, the test patterns can be pre-printed or pre-formed prior to printing the content on the print media. By way of example only, the test patterns can be printed on the print media using a marker pulse produced by an encoder located on the feed roller as the print media unwinds from the feed roller.

Next, as shown in block 902, the print media is scanned and images of two sets of test patterns are substantially simultaneously captured by the integrated imaging systems in one or more pairs of imaging systems. The two sets of test patterns are separated by the pattern distance $D_P$ while the integrated imaging systems in each pair of integrated imaging systems are separated by the fixed distance $D_K$. As discussed earlier, in one embodiment one set of test patterns is printed along the upstream margin and the other set along the downstream margin of the print media.

The measured test pattern signals are then analyzed at block 904 to determine whether size variations have occurred in the print media in the in-track direction. The amplitudes of the test pattern signals produced by the imaged sets of test patterns are used to determine whether the print media has stretched or shrunk in an embodiment in accordance with the invention. In another embodiment in accordance with the invention, the amplitude difference between adjacent measured test pattern signals can be used to determine size variations in the print media have occurred in the in-track direction.

A determination is then made at block 906 as to whether or not the print media has experienced size variations. If size variations have occurred, a determination is made at block 908 as to whether or not the size variation or variations equals or exceeds a threshold value. The threshold values can be stored in a storage device (e.g., 312 in FIG. 3). Those skilled in the art will recognize that the threshold values can be updated during a print job to optimize the threshold values for the print job.

If the size variation or variations equal or exceed the threshold value(s), appropriate compensation values are computed and one or more operations or settings of the printing system are adjusted based on the compensation values (block 910). For example, the times at which ink drops are ejected can be modified, or the speed of the print media can be changed to compensate for the size variations.

Other embodiments in accordance with the invention can modify, delete, or add blocks to the embodiment shown in FIG. 9. For example, block 908 can be omitted in another embodiment.

FIGS. 10A-10C illustrate a first set of examples of scanned test patterns and resulting test pattern signals in an embodiment in accordance with the invention. The resulting test pattern signals can be analyzed at block 904 in FIG. 9 to determine whether size variations have occurred in the print media. The set of test patterns 1000 represent an upstream set of test patterns on a print media while the set of test patterns 1002 represent a downstream set of test patterns. One or more differences between the amplitudes in the resulting test pattern signals for the upstream and downstream sets of test patterns can be used to determine whether any size variations in the print media have occurred. Scans of both sets of test patterns are captured at the same or substantially the same time.

FIG. 10A depicts an embodiment where size variations have not occurred in the print media. Both integrated imaging systems in a pair of integrated imaging systems begin scanning at time $T_0$ and stop scanning at time $T_1$. As illustrated, five dots in test pattern 800, four dots in test pattern 802, and two dots in test pattern 804 are scanned during time $T_{ON}$. The amplitudes of the resulting upstream test pattern signal 1004 and downstream test pattern signal 1006 corresponding to test patterns 800, 802, 804 are 5, 4 and 2 units high, respectively. Since the resulting test pattern signals 1004, 1006 for both the upstream and downstream sets of test patterns are the same; the differences between the respective amplitudes are zero for all three amplitudes.

When the print media shrinks, perhaps due to the interaction of ink with the print media in the content area between the upstream and downstream margins, the integrated imaging systems in a pair of integrated imaging systems can capture different images (see FIG. 10B). Again, both integrated imaging systems in the pair of integrated imaging systems begin scanning at time $T_0$ and stop scanning at time $T_1$. As illustrated, five dots in test pattern 800, four dots in test pattern 802, and two dots in test pattern 804 in the upstream set of test patterns 1008 are scanned during time $T_{ON}$. But the downstream set of test patterns 1010 is shifted closer to the upstream set of test patterns 1008 as a result of the shrinkage. Since the integrated imaging systems in the pair are mechanically connected together, six dots in test pattern 800, four dots in test pattern 802, and two dots in test pattern 804 are scanned during time $T_{ON}$.

The amplitudes of the resulting upstream test pattern signal 1012 are 5, 4, and 2 units high, while the amplitudes of the resulting downstream test pattern signal 1014 are 6, 4 and 2 units high. If the resulting upstream test pattern signal 1012 is subtracted from the resulting downstream test pattern signal 1014, the difference between the amplitudes for the test pattern 800 is positive one unit and the differences in amplitudes for the remaining test patterns are zero. One or more of these differences is used when determining compensation values for one or more settings or operations in the printing system to compensate for the shrinkage.

FIG. 10C illustrates an embodiment where print media stretches. For example, the print media in the content area can stretch due to the interaction of ink with the print media. Again, the integrated imaging systems in a pair of integrated imaging systems can capture different images. Both integrated imaging systems in the pair of integrated imaging systems begin scanning at time $T_0$ and stop scanning at time $T_1$. As illustrated, five dots in test pattern 800, four dots in test pattern 802, and two dots in test pattern 804 in the upstream set of test patterns 1016 are scanned during time $T_{ON}$. But the downstream set of test patterns 1018 is shifted farther from the upstream set of test patterns 1016 as a result of the stretch. Since the integrated imaging systems in the pair are mechanically connected together, four dots in test pattern 800, four dots in test pattern 802, and two dots in test pattern 804 in the downstream set of test patterns 1018 are scanned during time $T_{ON}$.

The amplitudes of the resulting upstream test pattern signal 1020 are 5, 4, and 2 units high, while the amplitudes of the resulting downstream test pattern signal 1022 are 4, 4 and 2 units high. If the resulting upstream test pattern signal 1020 is subtracted from the resulting downstream test pattern signal 1022, the difference between the amplitudes for the test pattern 800 is negative one unit and the differences in amplitudes for the remaining test patterns are zero. One or more of these differences is used when determining compensation values for one or more settings or operations in the printing system to compensate for stretch.

Figure 11C:
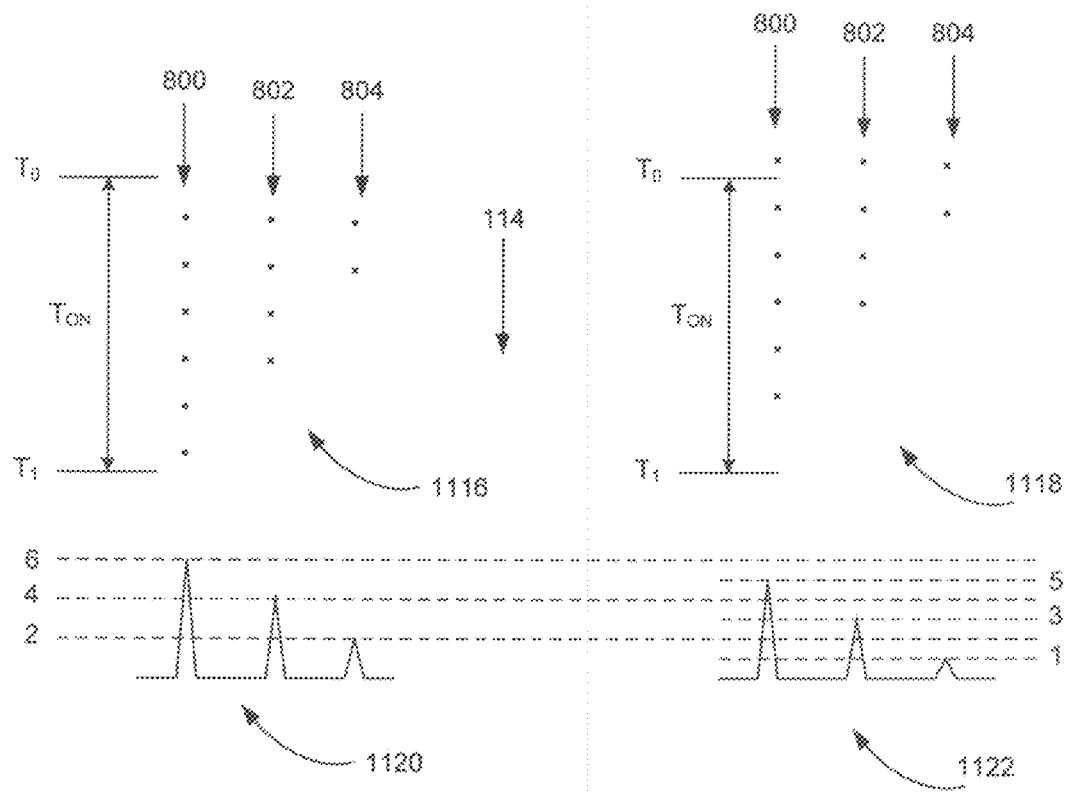
FIGS. 11A-11C depict a second set of examples of scanned test patterns and resulting test pattern signals in an embodiment in accordance with the invention.
Figure 11A:
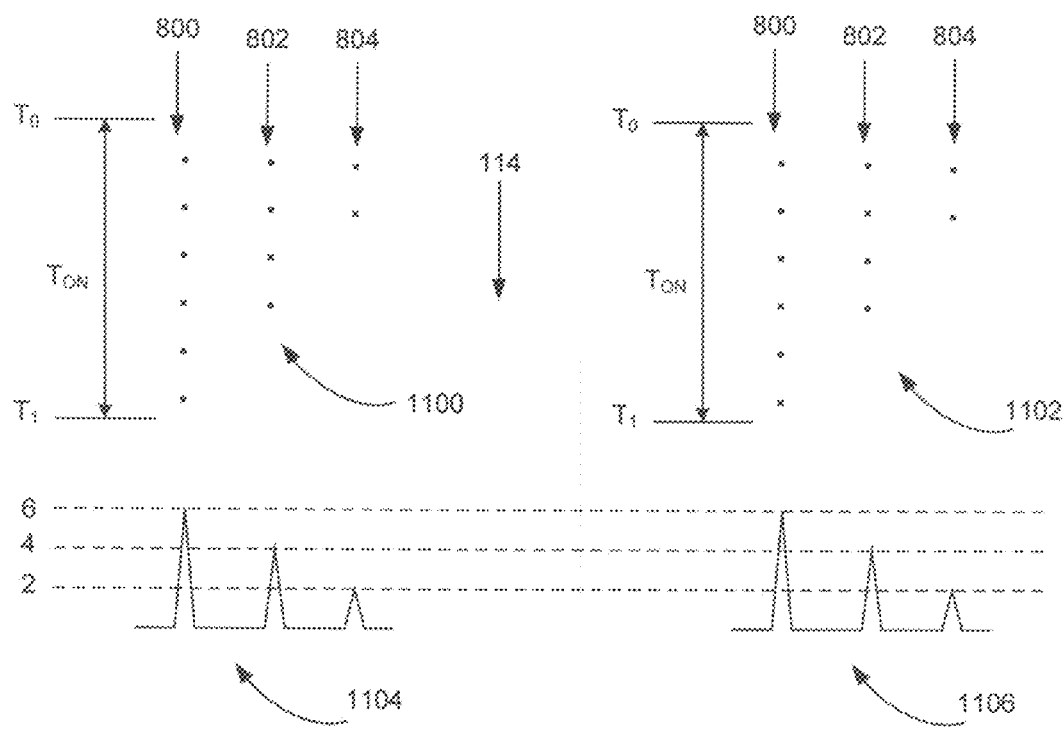
Figure 11B:
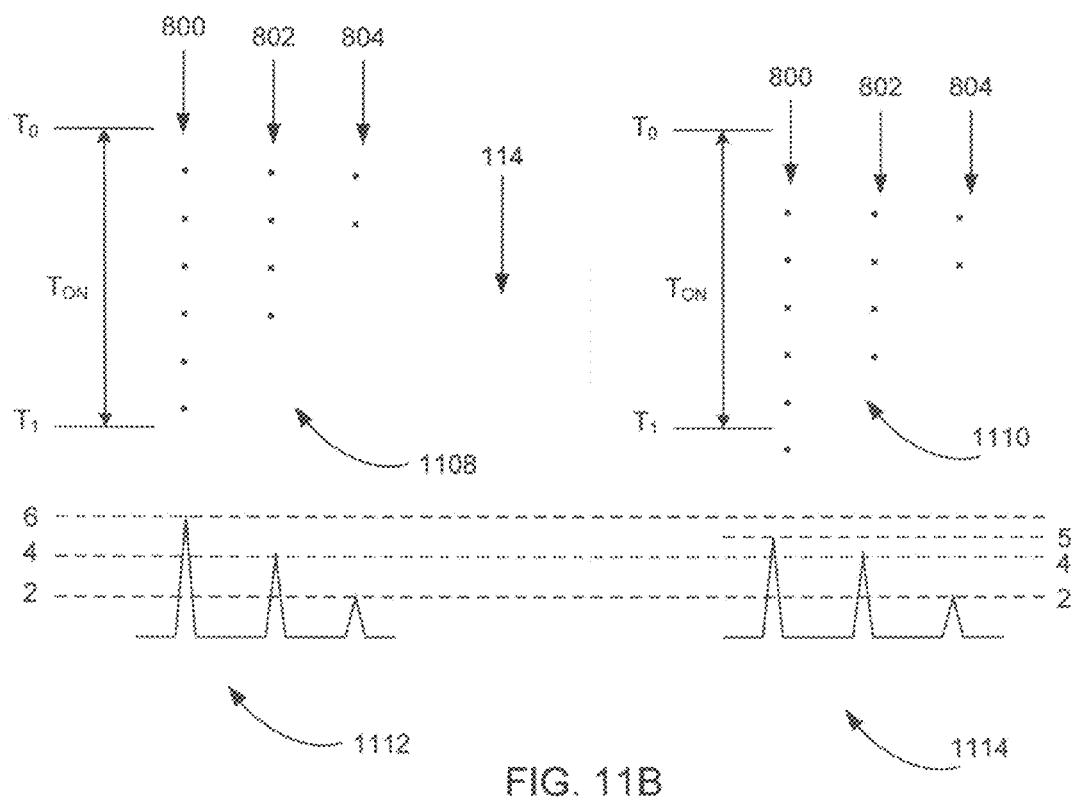

FIGS. 11A-11C depict a second set of examples of scanned test patterns and resulting test pattern signals in an embodiment in accordance with the invention. This example also serves to illustrate that one or more differences between the two captured images, or the resulting test pattern signals, are used to determine whether size variations in the print media have occurred in the in-track direction. The set of test patterns 1100 represent an upstream set of test patterns on a print media while the set of test patterns 1102 represent a downstream set of test patterns. One or more differences between the amplitudes in the resulting test pattern signals for the upstream and downstream sets of test patterns can be used to determine whether any size variations in the print media have occurred. Scans of both sets of test patterns are captured at the same or substantially the same time.

FIG. 11A depicts an embodiment where size variations in the print media have not occurred. Both integrated imaging systems in a pair of integrated imaging systems begin scanning at time $T_0$ and stop scanning at time $T_1$. As illustrated, six dots in test pattern 800, four dots in test pattern 802, and two dots in test pattern 804 are scanned during time $T_{ON}$. The amplitudes of the resulting upstream test pattern signal 1104 and downstream test pattern signal 1106 corresponding to test patterns 800, 802, 804 are 6, 4 and 2 units high, respectively. Since the resulting test pattern signals 1104, 1106 for both the upstream and downstream sets of test patterns are the same; the differences between the respective amplitudes are zero for all three amplitudes.

When the print media stretches, perhaps due to the interaction of ink with the print media in the content area between the upstream and downstream margins, the integrated imaging systems in a pair of integrated imaging systems can capture different images (see FIG. 11B). Again, both integrated imaging systems in the pair of integrated imaging systems begin scanning at time $T_0$ and stop scanning at time $T_1$. As illustrated, six dots in test pattern 800, four dots in test pattern 802, and two dots in test pattern 804 in the upstream set of test patterns 1108 are scanned during time $T_{ON}$. But the downstream set of test patterns 1110 is shifted farther from the upstream set of test patterns 1108 as a result of the stretch. Since the integrated imaging systems in the pair are mechanically connected together, five dots in test pattern 800, four dots in test pattern 802, and two dots in test pattern 804 in the downstream set of test patterns 1110 are scanned during time $T_{ON}$.

The amplitudes of the resulting upstream test pattern signal 1112 are 6, 4, and 2 units high, while the amplitudes of the resulting downstream test pattern signal 1114 are 5, 4 and 2 units high. If the resulting upstream test pattern signal 1112 is subtracted from the resulting downstream test pattern signal 1114, the difference between the amplitudes for the test pattern 800 is negative one unit and the differences in amplitudes for the remaining test patterns are zero. One or more of these differences is used when determining compensation values for one or more settings or operations in the printing system to compensate for stretch.

FIG. 11C illustrates an embodiment where the print media shrinks. For example, the print media in the content area can shrink due to the interaction of ink with the print media. The integrated imaging systems in a pair of integrated imaging systems can capture different images. Both integrated imaging systems in the pair of integrated imaging systems begin scanning at time $T_0$ and stop scanning at time $T_1$. As illustrated, six dots in test pattern 800, four dots in test pattern 802, and two dots in test pattern 804 in the upstream set of test patterns 1116 are scanned during time $T_{ON}$. But the downstream set of test patterns 1118 is shifted closer to the upstream set of test patterns 1116 as a result of the shrinkage. Since the integrated imaging systems in the pair are mechanically connected together, five dots in test pattern 800, three dots in test pattern 802, and one dot in test pattern 804 in the downstream set of test patterns 1118 are scanned during time $T_{ON}$.

The amplitudes of the resulting upstream test pattern signal 1120 are 6, 4, and 2 units high, while the amplitudes of the resulting downstream test pattern signal 1122 are 5, 3 and 1 units high. If the resulting upstream test pattern signal 1120 is subtracted from the resulting downstream test pattern signal 1122, the differences between the amplitudes for all three test patterns 800, 802, 804 are negative one unit. One or more of these differences is used when determining compensation values for one or more settings or operations in the printing system to compensate for shrinkage.

In one embodiment in accordance with the invention, the different combinations of differences in amplitudes and the compensation values for each combination can be stored in a look-up table in a storage device. For example, storage device 312 can be used to store the look-up table. Other embodiments can determine the compensation values differently.

The invention has been described in detail with particular reference to certain preferred embodiments thereof, but it will be understood that variations and modifications can be effected within the spirit and scope of the invention. And even though specific embodiments of the invention have been described herein, it should be noted that the application is not limited to these embodiments. In particular, any features described with respect to one embodiment may also be used in other embodiments, where compatible. And the features of the different embodiments may be exchanged, where compatible.

1. A printing system can include a print media having two sets of test patterns formed or printed in margins adjacent a content area on the print media and separated by a pattern distance $D_P$. At least two test patterns in each set of test patterns have a different number of marks. A pair of integrated imaging systems is disposed opposite the print media and mechanically connected to one another and separated by a fixed distance $D_K$. Each integrated imaging system in the pair of integrated imaging systems can include a housing; an opening in the housing for receiving light reflected from the print media; a folded optical assembly in the housing that receives the reflected light and transmits the light a predetermined distance; and an image sensor within the housing that receives the light and captures one or more images of a respective set of test patterns.

2. The printing system as in clause 1, where the two sets of test patterns can be two sets of non-objectionable test patterns.

3. The printing system in clause 1 or clause 2 can include an image processing device for processing the images of the two sets of test patterns to produce test pattern signals for each set of test patterns and for comparing each test pattern signal to a respective reference test pattern signal.

4. The printing system in clause 3 can include a storage device for storing one or more reference test pattern signals.

5. The printing system in clause 1 or clause 2 can include an image processing device for processing the images of the two sets of test patterns to produce a test pattern signal for each set of test patterns and for analyzing respective test pattern signals to detect a size variation in the print media in the in-track direction.

6. The printing system in clause 5 can include a storage device for storing test pattern signals.

7. The printing system in any one of clauses 1-6 can include at least two vent openings in each housing, one vent opening for inputting air or gas and one vent opening for outputting exhaust.

8. The printing system in any one of clauses 1-6 can include a vent opening in the housing for receiving air or gas.

9. The printing system as in clause 8, where the opening in the housing is used to output exhaust.

10. The printing system in any one of clauses 1-9 can include rollers for transporting the print media through the printing system.

11. The printing system in clause 10 can include a motion encoder connected to at least one roller, wherein the motion encoder is adapted to output a signal proportional to a fixed amount of incremental motion of the print media.

12. The printing system as in clause 10, where each integrated imaging system in a pair of integrated imaging systems is disposed over the print media at a location where the print media is transported over a roller.

13. A printing system can include one or more lineheads that jet liquid onto a print media and at least one pair of integrated imaging systems disposed over the print media and mechanically tied together and separated by a fixed distance $D_K$. A method for detecting size variations in the print media as the print media is transported through the printing system can include (a) substantially simultaneously capturing images of two sets of test patterns printed or formed in margins adjacent a content area on the moving print media, where the two sets of test patterns are separated by a pattern distance $D_P$ and at least two test patterns in each set of test patterns have a different number of marks; (b) producing test pattern signals each representing a respective set of test patterns in the captured images; and (c) analyzing the test pattern signals to determine whether a size variation has occurred in the print media in the in-track direction.

14. The method in clause 13 can include (d) determining one or more compensation values based on the size variation;

and (e) adjusting one or more operations or settings of the printing system based on the one or more compensation values.

15. The method in clause 14 can include prior to performing (d), determining whether the size variation equals or exceeds a threshold value, and if the size variation equals or exceeds the threshold value, performing (d).

16. The method in clause 14 or clause 15 can include repeating (a)-(e) a given number of times.

17. The method as in any one of clauses 13-16, where analyzing the test pattern signals to determine whether a size variation has occurred in the print media in the in-track direction includes analyzing one or more amplitudes in each test pattern signal to determine whether a size variation has occurred in the print media in the in-track direction.

18. The method as in any one of clauses 13-16, where analyzing the test pattern signals to determine whether a size variation has occurred in the print media in the in-track direction includes comparing at least one test pattern signal to a respective reference test pattern signal to determine whether a size variation has occurred in the print media in the in-track direction.

19. The method as in any one of clauses 13-18, where the two sets of test patterns include two sets of non-objectionable test patterns.

20. The method in clause 19 can include printing content and the two sets of non-objectionable test patterns on the print media.

21. The method as in clause 20, where the two sets of non-objectionable test patterns are printed within at least two margins around the content area.

22. The method as in any one of clauses 13-18, where the two sets of test patterns include two sets of visible test patterns.

23. The method in clause 22 can include printing the two sets of visible test patterns on the print media.

24. The method in clause 23 can include printing content on the print media after the two sets of test patterns are printed on the print media.

25. The method in clause 23 can include printing content on the print media when the two sets of visible test patterns are printed on the print media.

PARTS LIST 100 printing system
102 printing module
104 printing module
106 linehead
108 dryer
110 quality control sensor
112 print media
114 transport direction
116 turnover module
200 printing system
202 printhead
204 nozzle array
206 support structure
208 heat
210 integrated imaging system
212 connecting piece
300 printing system
304 print media
306 roller
308 image processing device
310 motion encoder
312 storage device
400 light source
401 opening in housing
402 transparent cover
404 folded optical assembly
406 image sensor
410 housing
412 mirror
414 mirror
416 lens
418 vent
420 vent
800 test pattern
802 test pattern
804 test pattern
806 upstream margin
808 downstream margin
900-910 blocks
1000 upstream set of test patterns
1002 downstream set of test patterns
1004 resulting test pattern signal
1006 resulting test pattern signal
1008 upstream set of test patterns
1010 downstream set of test patterns
1012 resulting test pattern signal
1014 resulting test pattern signal
1016 upstream set of test patterns
1018 downstream set of test patterns
1020 resulting test pattern signal
1022 resulting test pattern signal
1100 upstream set of test patterns
1102 downstream set of test patterns
1104 resulting test pattern signal
1106 resulting test pattern signal
1108 upstream set of test patterns
1110 downstream set of test patterns
1112 resulting test pattern signal
1114 resulting test pattern signal
1116 upstream set of test patterns
1118 downstream set of test patterns
1120 resulting test pattern signal
1122 resulting test pattern signal
$D_K$ fixed distance between integrated imaging systems
$D_P$ pattern distance between two sets of test patterns
$T_{ON}$ time on
$T_{OFF}$ time off
$T_0$ time scanning begins
$T_1$ time scanning ends

The invention claimed is:

1. A printing system comprising:
    a print media;
    two sets of test patterns formed or printed in margins adjacent a content area on the print media and separated by a pattern distance $D_P$, where at least two test patterns in each set of test patterns have a different number of marks;
    a pair of integrated imaging systems disposed opposite the print media and mechanically connected to one another and separated by a fixed distance $D_K$, wherein each integrated imaging system is configured to provide a defined integration time for capture of one or more images of each of the set of test patterns to produce an optically averaged image of each of the set of test patterns, and wherein each integrated imaging system in the pair of integrated imaging systems comprises:
        a housing;
        an opening in the housing for receiving light reflected from the print media;

a folded optical assembly in the housing that receives the reflected light and transmits the light a predetermined distance; and an image sensor within the housing that receives the light and captures one or more images of a respective set of test patterns; and an image processing device for processing the optically averaged images of each of the sets of test patterns to produce test pattern signals for each set of test patterns and for comparing each test pattern signal to a respective reference test pattern signal to determine whether a size variation has occurred in the print media.

2. The printing system as in claim 1, wherein the two sets of test patterns comprise two sets of non-objectionable test patterns.

3. The printing system as in claim 1, further comprising a storage device for storing one or more reference test pattern signals.

4. The printing system as in claim 1, further comprising an image processing device for processing the images of the two sets of test patterns to produce a test pattern signal for each set of test patterns and for analyzing respective test pattern signals to detect a size variation in the print media in the in-track direction.

5. The printing system as in claim 4, further comprising a storage device for storing test pattern signals.

6. The printing system as in claim 1, further comprising at least two vent openings in each housing, one vent opening for inputting air or gas and one vent opening for outputting exhaust.

7. The printing system as in claim 1, further comprising a vent opening in the housing for receiving air or gas.

8. The printing system as in claim 7, wherein the opening in the housing is used to output exhaust.

9. The printing system as in claim 1, further comprising rollers for transporting the print media through the printing system.

10. The printing system as in claim 9, further comprising a motion encoder connected to at least one roller, wherein the motion encoder is adapted to output a signal proportional to a fixed amount of incremental motion of the print media.

11. The printing system as in claim 9, wherein each integrated imaging system in a pair of integrated imaging systems is disposed over the print media at a location where the print media is transported over a roller.

* * * * *